United States Patent [19]

Lee et al.

[11] 4,202,746

[45] May 13, 1980

[54] PREPARATION OF WATER-DILUTABLE POLYMERIC COMPOSITIONS AND CATHODIC COATING OF METALLIC SUBSTRATES

[75] Inventors: Cedric Lee, Harlow; Martin E. Burrage, Bishops Stortford, both of England

[73] Assignee: Polymer Investments N.V., Curacao, Netherlands Antilles

[21] Appl. No.: 919,101

[22] Filed: Jun. 26, 1978

[30] Foreign Application Priority Data

Jun. 27, 1977 [GB] United Kingdom ............... 26849/77

[51] Int. Cl.$^2$ ............................................. C25D 13/06
[52] U.S. Cl. ................................................. 204/181 C
[58] Field of Search ..................................... 204/181 C

[56] References Cited

U.S. PATENT DOCUMENTS

| | | | |
|---|---|---|---|
| 3,617,458 | 11/1971 | Brockman | 204/181 C |
| 3,719,626 | 3/1973 | May | 204/181 C |

*Primary Examiner*—Howard S. Williams
*Attorney, Agent, or Firm*—Sughrue, Rothwell, Mion, Zinn and Macpeak

[57] ABSTRACT

An aqueous water-dilutable composition for use as a cathodic coating material is prepared by partially epoxidizing a liquid polydiene, all or a major proportion of which is derived from a 1,4-conjugated diene, such as butediene, aminating the epoxidized polydiene at a temperature of at least 120° C. and, optionally in the presence of an organic hydroxy-group-containing catalyst, with at least polyamine reactant which contains not more than one primary amino group and/or at least one secondary amine group with the or any remaining amine group(s) being selected from secondary and tertiary amine groups and thereafter partially neutralizing the aminated polymeric material with acid to yield a water-dilutable material containing residual unsaturation. The liquid polydiene has a molecular weight such that cathodically deposited material will not run off a vertical surface; the minimum molecular weight is preferably 1500 for a liquid polybutadiene homopolymer but may be as low as 1000 for a butadiene/styrene copolymer. A metal substrate is made a cathode while immersed in a bath of the aqueous water-dilutable composition using an anode as a counter-electrode and passage of an electric current deposits a layer of the polymeric material on the substrate. The electro-deposited polymeric material is subjected to oxidative cross-linking by reaction of the said residual unsaturation with atmospheric oxygen at elevated temperature to form a coating of improved toughness and flexibility.

7 Claims, No Drawings

PREPARATION OF WATER-DILUTABLE POLYMERIC COMPOSITIONS AND CATHODIC COATING OF METALLIC SUBSTRATES

FIELD OF THE INVENTION

This invention relates to a method of preparing an aqueous water-dilutable polymeric composition for use as a cathodically electro-depositable coating material on metallic substrates, to the composition so prepared, and to a process for applying a protective coating of a polymeric material to a metallic substrate using an aqueous polymeric composition prepared by the aforesaid method.

BACKGROUND OF THE INVENTION AND PRIOR ART

The application of protective coatings of polymers to electrically conductive surfaces by the electrodeposition thereon of organic polymeric materials is of established industrial importance. In recent years it has been shown that many of the shortcomings of the earlier anodic electro-deposition processes are obviated when the metallic article to be coated is used as the cathode rather than as the anode, the article to be coated being immersed in an aqueous bath containing an ionized derivative of the polymeric material to be deposited.

In order to be commercially acceptable, a polymeric composition for use in cathodic electro-deposition processes must be capable of forming a stable aqueous solution or dispersion which possesses sufficient concentration with respect to the polymer and which exhibits sufficient electrical conductivity to be capable of depositing a film of polymeric material on a metallic substrate, when an electric current is passed through the aqueous solution or dispersion, using the substrate as a cathode. Furthermore, the electro-deposited polymeric composition must have good film-forming properties and must not tend to run off, or to sag on, vertical surfaces when the object is removed from the electro-deposition bath, and to be displaced when the object is rinsed before further steps in the coating process. The deposited film must display good adhesion to the metallic substrate before drying, after drying and after any cross-linking of the deposited film. The dried and cross-linked coating should desirably be unstained, durable and corrosion resistant and should exhibit good adhesion to any subsequent coatings.

A further requisite of the aqueous polymeric solution or dispersion is the property of good throwing power, i.e., the ability of the solution or dispersion to deposit on the substrate a coating of uniform thickness, even on those areas of the substrate which are remote from or physically shielded from a counter-electrode. For many purposes, for example, for primer coatings for automobile bodies, a high degree of toughness is essential, combined with a degree of flexibility.

Certain low molecular weight so-called epoxy resins well known in the prior art, for example, the reaction products of epichlorhydrin with alpha, omega-dihydroxy compounds, or the low molecular weight polymers and copolymers derived from epoxy-alkyl acrylates or methacrylates, after modification by reaction with certain boron esters or with amines, are known to exhibit many of the aforesaid desirable properties required of cathodically electrodepositable polymeric compositions. It may happen that the necessary degree of durability or scratch resistance, after cross-linking in order to form the protective coating, cannot be achieved with the accompaniment of a sufficient degree of flexibility and/or corrosion resistance. It is also necessary that such a product, after modification and admixture with water in order to form an aqueous solution or dispersion, should contain free epoxide or other reactive functional groups which are capable of participation in cross-linking reactions during the coating process at a stage subsequent to electro-deposition. These reactive groups required for cross-linking, or their precursors, are introduced during the first stage of synthesis of the low molecular weight polymer and are very reactive. The objective of so modifying the polymer in order to promote water-solubility such that it is cathodically electro-depositable, and additionally to provide for the presence of reactive functional groups for the sake of cross-linking after the step of electro-deposition on the metal substrates, is difficult to achieve without at least incurring the risk of cross-linking the polymer at some stage before electro-deposition. Such a result is highly undesirable in that premature gelation may occur, leading to a product difficult or impossible to dissolve or disperse in water.

It may also be necessary to provide one or more specific agents which are co-reactive with the reactive groups of the low molecular weight resin, in order to provide for and/or in order to promote cross-linking, and to achieve an acceptable combination of properties of the final protective coating. These additional agents must be introduced into and dispersed in the aqueous composition.

A further drawback attached to use of such prior art compositions is that the starting materials needed for synthesis of the low molecular resins are often relatively costly.

The prior art describes processes for coating electrically conductive articles whereby the article is used as a cathode in an aqueous bath containing a basic resin which is at least partially neutralised with an acidic substance such as an organic carboxylic acid, wherein it is suggested that the basic resin may be derived, inter alia, from epoxidised polybutadiene. However, it is not always specified that the epoxidised polybutadiene should be a liquid substance, and where it is suggested that low molecular weight polybutadienes are used which are probably liquid polybutadienes, the recommended molecular weight of the polymer is so low that difficulties would be liable to occur during the electro-deposition, such as inefficient throwing power and/or run down of the coating on vertical surfaces. Furthermore, the conditions for conversion of epoxidised polybutadiene into basic cathodically electro-depositable resins are seldom specified and as will be shown hereinafter, the possibilities exist on the one hand of inadequate reaction of the polybutadiene epoxide with organic amines in order efficiently to form cathodically electro-depositable resins, or on the other hand, of giving rise to gelation during said reaction. (U.S. Pat. No. 3,716,402 and British Pat. No. 1,407,410).

SUMMARY OF THE INVENTION

We have now discovered that aqueous polymeric compositions highly suitable for use in cathodic electro-deposition coating processes can be formed from certain resins derived from liquid polydienes, and that ungelled liquid polymeric compositions which form stable aqueous solutions or dispersions, and which may be electrically deposited efficiently on a cathodic metal substrate, and which cross-link readily, can be provided using relatively inexpensive starting materials and relatively simple and controllable procedures.

According to one aspect of the present invention, there is provided a method of preparing an aqueous water-dilutable polymeric composition for use as a cathodic coating material, comprising the steps of partially epoxidising a liquid polydiene selected from the group consisting of homopolymers of a 1,4-conjugated diene and copolymers comprising a major proportion by weight of a 1,4-conjugated diene and a minor proportion by weight of monomer copolymerisable therewith, the liquid polydiene having a molecular weight such that a cathodically deposited layer of the composition will not substantially tend to run off a vertical surface, aminating the epoxidised polydiene at a temperature of at least 120° C. with at least one polyamine reactant (is heretofore declined) to provide an ungelled liquid aminated epoxidised polymer containing at least one milliequivalent of combined amine groups per gram of said liquid derivated polymer and thereafter at least partially neutralising the aminated polymeric material with acid to yield a water-dilutable material containing residual unsaturation in the polymer chain.

According to a further aspect of the present invention, there is provided a process for applying a protective coating of a polymeric material to a metal substrate, comprising the steps of connecting the substrate as a cathode while immersed in a bath of an aqueous polymeric composition, connecting an anode as a counter-electrode in said bath, passing electric current between said anode and cathode thereby to electro-deposit polymeric material on said substrate, said polymeric composition comprising a water-dilutable composition obtained by the steps of partially exposidising a liquid polydiene selected from the group consisting of homopolymers of a 1,4-conjugated diene and copolymers comprising a major proportion by weight of a 1,4-conjugated diene and a minor proportion of monomer copolymerisable therewith, the liquid polydiene having a molecular weight such that the cathodically deposited layer of polymeric material will not substantially tend to run off a vertical surface, aminating the epoxidised polydiene at a temperature of at least 120° C. with at least one polyamine reactant (as heretofore defined); to provide an ungelled liquid aminated epoxidised polymer containing at least one milliequivalent of combined amine groups per gram of said liquid aminated polymer, and thereafter at least partially neutralising the aminated polymeric material with acid to yield a water-dilutable material containing residual unsaturation in the polymer chain, and subjecting the electrodeposited polymeric material to oxidative cross-linking by reaction of residual unsaturation in the polymer chain with atmospheric oxygen at elevated temperature.

Further aspects of the present invention provide the aqueous water-dilutable composition prepared by the above method and a metal substrate coated by the above process.

The liquid polydienes used as starting materials for making the cathodically electro-depositable coating material by the present method and for use in the cathodic electro-deposition process comprise the homopolymers of 1,4-conjugated dienes, and the liquid copolymers of one or more 1,4-conjugated dienes with one or more other ethylenically unsaturated copolymerisable monomers, such that the copolymer has a constitution consisting of at least 50% by weight of copolymerised units derived from one or more conjugated dienes, said homopolymers or copolymers of 1,4-conjugated dienes being prepared by any polymerisation technique known per se to result in the formation of liquid polymers or copolymers.

The dienes which can be converted into liquid polymeric products are well known. Examples are 1,4-butadiene and 2-methyl-1,4-butadiene, butadiene being preferred. Likewise, ethylenically unsaturated monomers copolymerisable with 1,4-conjugated dienes to form liquid copolymers are well known and numerous. Examples are styrene, alpha-methyl styrene, acrylonitrile and methyl methacrylate, styrene being preferred.

The molecualr weight of the liquid polymer or copolymer of 1,4-conjugated diene should not be too low. It is found that if this value is too low, then the throwing power of the cathodic electro-coating bath is deficient, and, equally seriously, the fresh coating deposited tends to run off vertical surfaces. The minimum molecular weight of the liquid diene polymer or copolymer, in order to overcome these and other drawbacks, will be determined to some extent by factors such as the constitution in the case of a copolymer, the microstructure of copolymerised diene residues, etc., but an approximate minimum in the case of a liquid polybutadiene homopolymer is 1500, expressed as a number-average, and not less than about 1000 in the case of a butadiene/styrene copolymer containing about 50% by weight of copolymerised butadiene units.

A preferred starting material is a liquid polybutadiene homopolymer having a number-average molecular weight of about 2000.

In the first step in the present method for preparing a cathodically electro-depositable coating composition, the unsaturated carbon-carbon bonds of the liquid diene polymer or copolymer are epoxidised by well-known methods e.g. by treatment with a peroxy acid, such as peracetic acid. The degree of epoxidation i.e. the proportion of double bonds present which are reacted in such a way as to participate in oxirane ring formation, is conveniently such that the epoxidised liquid polydiene contains from 2% to 10% by weight of epoxide oxygen expressed as a proportion of the total weight of polymer and preferably from 3.5% to 8% by weight. The degree of epoxidation will depend mainly upon the degree of amination required, that is to say, the proportion of combined amine groups in the aminated epoxidised polydiene, which in turn will depend upon a number of factors, principally upon the degree of water-sensitivity required of the aminated epoxidised liquid polydiene.

In any case, the epoxidised liquid diene polymer or copolymer should contain sufficient olefinic unsaturation in the macromolecules to render the cathodically electro-deposited resin cross-linkable to a solid product by oxidative cross-linking. As an approximate guide to the minimum degree of epoxidation necessary, sufficient to provide one milliequivalent of combined amine groups per gram of aminated epoxidised polymer or copolymer will usually make the polymer at least water-dispersible after neutralisation, but higher proportions of amine groups are not excluded as is described hereinafter.

The precise proportion of combined amine groups required to confer actual water-solubility upon the polymer after neutralisation of the amine groups depends upon a number of factors, including the basicity of the particular amine group or groups, the molecular weight and constitution of the liquid polydiene or diene copolymer, its microstructure, the nature and concentration of counter-ions, the nature and proportion of co-solvents with water, etc..

As a further guide to the degree of epoxidation required, it is found to be an advantage that the aminated epoxidised polydiene should contain some unreacted epoxide groups i.e. groups which have not reacted with the amine or amines, for reasons which appear hereinafter.

The amination proceeds by the ring-opening reaction of a primary or secondary amine group with an epoxide group in the polymer or copolymer to form an aminoalcohol. The epoxide groups of epoxidised liquid polydienes are of relatively low reactivity compared with those in copolymers derived from epichlorohydrin or from glycidyl acrylates and methacrylates.

The reaction can be carried out by heating the epoxidised polymer with one or more amines, the optimum temperature about 120° C. depending upon the amine used and any catalyst which may be used. The reaction may be carried out in the presence of a solvent which is inert in the reaction, if this should be desirable. It is preferred to use a high boiling polyamine, such as one having a boiling point above 120° C., as the polyamine reactants for the amination step but lower boiling polyamine reactant may be used by carrying out the reaction in closed vessels under autogeneous pressures.

For commercial as well as for technical reasons such as the need to avoid gelation through undesirable side-reactions during the amination step, it is desirable to complete the amination reaction within a reasonably short period, for example, about 6 hours. Such a result may be achieved by operating under reaction conditions which ensure that an excess of epoxide groups is present relative to reactive amine groups, and by refluxing the reaction mixture with a high boiling polyamine reactant at a temperature of (say) 160° to 180° C., the exact temperature and time required also depending on the nature and concentration of the reactant, the relative proportion of epoxide groups, the nature of the catalyst etc.. It should be noted that due to the relatively sluggish rate of reaction of polydiene epoxide with primary and secondary groups, even in the presence of catalyst and in the presence of stoichiomeric proportions of reactive amine groups relative to epoxide groups, it is generally desirable to teerminate this step before all the epoxide groups have reacted, in order to reduce the risk of premature gelation. In any case, in order to shorten the reaction period, it is generally necessary to terminate the amination step before all available epoxide groups have reacted with primary or secondary amine groups.

Less desirably, a faster reaction may be obtained by use of a proportion of amine in excess of that calculated to be stoichiometrically equivalent to the proportion of epoxide groups present, in which case any unreacted amine must be removed after completion of the amination reaction.

When operating under the preferred conditions, it is usually also a preferred procedure to carry out the reaction of epoxidised polybutadiene with the polyamine reactant in the presence of one or more ring-opening catalysts for the reaction, suitable catalysts including hydroxy group-containing compounds such as ethanediol or a phenol, a phenol being preferred, as well as hydroxy group-containing amines, such as ethanolamine or other alkanolamines, where the presence of the hydroxy group has a catalytic effect.

Nevertheless, it is to be appreciated from the earlier description that the amination step may be carried out in the absence of a ring-opening catalyst, by adjustment of the reaction conditions by the means indicated. Furthermore, if the amine contains a hydroxy group, such as in ethanolamine or in another alkanolamine, the reaction proceeds readily due to the presence of the catalytic effect of the hydroxy group in the amine itself.

It is surprising that epoxidised polydienes e.g. epoxidised polybutadiene, are capable of reaction with a wide variety of polyamine reactants (as will now be defined) to form cathodically electrodepositable materials, without causing gelation. The term "polyamine reactant" is defined in the specification to mean a compound which contains not more than one primary amine group and/or at least one secondary amine group, with the or any remaining amine group(s) being selected from secondary and tertiary amine groups, and the compound being free of other groups reactive under the conditions of amination. Because polyamines containing more than one primary amine group cause gelation, they are excluded from the above definition, but it is to be understood that polyamines containing more than one secondary amine group may be used, even when one primary amine group is also present. Further, although alkanolamines may be present as catalysts, as previously indicated, these alkanolamines are used in conjunction with one or more polyamines which do not contain hydroxyl groups, since otherwise they may give rise to reaction products having an excessive viscosity. It is preferred to use aliphatic polyamines in order to achieve sufficient basicity. Preferred polyamines are those containing one primary and at least one tertiary amino group.

As indicated previously, approximately one milliequivalent of total combined amine groups per gram of aminated epoxidised polymer or copolymer is usually sufficient to confer water-dispersibility at least, after neutralisation. The higher the molecular weight of the liquid polydiene, the higher will be the proportion of combined amine in order to confer actual water-solubility. Thus a preferred broad range of amine contents is from 1.5 to 2.5 milleuqivalents per gram of aminated epoxidised polydiene. Excessive proportions of combined amine are undesirable in that they give rise to inferior electro-deposition behaviour.

As indicated above, a preferred group of polyamines comprises primary-tertiary amines. These react quite readily due to the presence of the reactive primary amine group, the tertiary amine group being relatively unreactive under the conditions involved in the amination but being available to confer ease of solubility or of dispersion in water or the salt of the reaction product. Use of a lower proportion of epoxy groups is thereby rendered possible when working with such polyamines than would otherwise be essential for the sake of water-solubility or dispersibility.

An example of such a primary-tertiary amine is 4-(3-aminopropyl)morpholine which besides the advantages enumerated above possesses the additional advantage of conferring superior corrosion resistance to cathodically electro-coated metal substrates.

The resulting aminated epoxidised polydiene is an ungelled liquid polymer. Further reaction of the amino groups during amination, such as would lead to a cross-linked polymer, can be avoided by appropriate selection of the amines or amines as indicated previously, by use of catalysts for the amination reaction and by adjustment of the conditions employed for the reaction with the epoxidised polybutadiene. Furthermore, the reaction conditions are preferably so regulated as just indicated that any tertiary amine groups in the aminated plymer do not react further with epoxide groups in the polymer to give quaternary amine groups.

As stated previously, cross-linking on a metal substrate of a film of the cathodically deposited polymer can readily be achieved by means of a conventional oxidative reaction of the residual carbon-carbon double bonds with atmospheric oxygen, and cross-linking is achieved predominantly through this mechanism in carrying out the present method. However, we do not necessarily exclude provision in the electrocoating bath of one or more substances which are co-deposited on the metal substrate cathode together with the aminated epoxidised liquid polybutadiene and which are coreactive therewith under the conditions used for oxidative cross-linking, in order to provide an auxiliary cross-linking mechanism.

The resulting aminated epoxidised liquid polybutadiene is then wholly or partially neutralised with one or more acids, and is mixed with water to give an aqueous liquid which may be a clear solution, an emulsion or a dispersion depending upon the factors already discussed including the proportion of amine groups introduced and on the extent of neutralisation. This step is conventional, and the acids used may be those conventionally employed in cathodic electro-deposition baths. They are preferably but not necessarily organic, such as acetic, lactic and formic acids.

In the preparation of electro-coating materials, the presence of pigments or other additives conventional in the electrodeposition coating art may be required. Such additives may conveniently be incorporated in the aminated polymer before admixture of water.

The invention will now be illustrated by the following Examples, of which Examples I to III are in accordance with the invention and Example IV is comparative.

EXAMPLE I

Four hundred grams of a liquid polybutadiene, having a number average molecular weight of 2,600, commercially available as 'Lithene' PH ('Lithene' is a registered Trade Mark), which had been epoxidised so that it contained 4.5% by weight epoxide oxygen, were mixed at room temperature with 51 g. 4-(3-aminopropyl)morpholine, 5 g. phenol, and 80 g. 2-n-butoxyethanol. The mixture was stirred and heated at a temperature of 175° C. for six hours and was then allowed to cool. Eighty seven grams of the cooled resin were thoroughly mixed with 3.75 g. lactic acid and 1500 g. distilled water to give an aqueous solution of the resin.

In order to demonstrate the suitability of this material for coating by electrodeposition, the aqueous solution was placed in an electrical cell having rectangular phosphated steel plates as electrodes. The design of the cell was such that the electrodes were held parallel and facing each other a distance of two inches apart. A voltage of 100 volts was applied across the plates for two minutes. The electrodes were removed from the cell and it was found that the resin had been electrodeposited on the cathode. The cathode was rinsed with water and the coated film was cured by heating the coated plate held vertically in an oven at 180° C. for thirty minutes. The plate had a hard, even coating having an average thickness of 0.001 inch and a pencil hardness of 3H. The deposited film showed a good throwing power of 9 cm. on 16 cm. of shielded, immersed plate, this measurement of throwing power being dependent on the construction of the cell. The deposited film showed good corrosion protection in the ASTM corrosion test.

EXAMPLE II

Four hundred grams of a liquid polybutadiene commercially available as 'Lithene' PH, which had been epoxidised so that it contained 4.5% by weight epoxide oxygen, were mixed at room temperature with 51 g. 4-(3-aminopropyl)morpholine, 5 g. phenol, and 80 g. 2-n-butoxyethanol. The mixture was stirred and heated at a temperature of 175° C. for three hours after which time 5.04 g. dicyandiamide were added. The mixture was heated with stirring for a further two hours at 175° C. and then allowed to cool. Eightly seven grams of the cooled resin were thoroughly mixed with 3.25 g. lactic acid and 1500 g. distilled water to give an aqueous solution of the resin.

An electrodeposit was obtained by the method described in Example 1.

EXAMPLE III

Four hundred grams of a liquid polybutadiene commercially available as 'Lithene' PH, which had been epoxidised so that it contained 4.5% by weight epoxide oxygen, were mixed at room temperature with 51 g. 4-(3-aminopropyl)morpholine, 6.5 g. p-aminophenol, and 80 g. 2-n-butoxyethanol. The mixture was stirred and heated at a temperature of 175° C. for six hours and was then allowed to cool. Eighty seven grams of the cooled resin were thoroughly mixed with 3.75 g. lactic acid and 1500 g. distilled water to give an aqueous solution of the resin.

An electrodeposit was obtained by the method described in Example I. The desirability of using a higher molecular weight polydiene as starting material may be seen from the following comparative Example in which a polydiene having molecular weight of less than 1500 has been used.

EXAMPLE IV

Eighty grams of a liquid polybutadiene, having a number average molecular weight of 900, commercially available as 'Lithene' PL, which had been epoxidised so that it contained 6.2% by weight epoxide oxygen, were mixed at room temperature with 8.25 g. morpholine. The mixture was stirred and heated at a temperature of 160° C. for three hours and was then allowed to cool. Seventy five grams of the cooled resin were thoroughly mixed with 5 g. glacial acetic acid and 1500 g. distilled water to give an aqueous emulsion of the resin.

An electrodeposit was prepared by the method described in Example I and the coated film was cured by heating the coated plate in an oven at 180° C. for thirty minutes, but the cured plate was unsatisfactory because most of the coating had run down the plate before curing and formed a ridge of coating at the bottom of the plate.

It was possible to obtain a hard coating on another plate only when the plate was held horizontally to prevent the coating from running down the plate before curing. This is obviously unsatisfactory for normal commercial operations.

What is claimed is:

1. A process for applying a protective coating of a polymeric material to a metal substrate, comprising the steps of connecting the substrate as a cathode while immersed in a bath of an aqueous polymeric composition, connecting an anode as a counter-electrode in said bath, passing electric current between said anode and cathode thereby to electrodeposit polymeric material on said substrate, said polymeric composition comprising a water-dilutable composition obtained by the steps of partially epoxidising a liquid polydiene selected from the group consisting of homopolymers of a 1,4-conjugated diene and copolymers comprising a major proportion by weight of a 1,4-conjugated diene and a minor proportion of monomer copolymerisable therewith, the liquid polydiene having a molecular weight such that the cathodically deposited layer of polymeric material will not substantially tend to run off a vertical surface, aminating the epoxidised polydiene at a temperature of at least 120° C. with at least one polyamine reactant to provide an ungelled liquid aminated epoxidised polymer containing at least one milliequivalent of combined amine groups per gram of said liquid aminated polymer, and thereafter at least partially neutralising the aminated polymeric material with acid to yield a water-dilutable material containing residual unsaturation in the polymer chain, and subjecting the electrodeposited polymeric material to oxidative cross-linking by reaction of residual unsaturation in the polymer chain with atmospheric oxygen at elevated temperature.

2. A process as claimed in claim 1, wherein the polymeric composition is water-soluble.

3. A process as claimed in claim 1 or 2, wherein the liquid polydiene is a liquid polybutadiene homopolymer having a molecular weight not less than 1500.

4. A process as claimed in claim 1 or 2, wherein the liquid polydiene is a butadiene/styrene copolymer having a molecular weight not less than 1000.

5. A process as claimed in any one of claim 1 or 2, wherein the cross-linking is effected by heating the electro-deposited polymeric material to a temperature of about 180° C. for about 30 minutes.

6. A process as claimed in any one of claim 1 or 2, wherein the aqueous polymeric composition additionally comprises one or more of pigments and other additives conventional in the electro-deposition art.

7. A metal substrate having thereon a protective coating applied by the process claimed in any one of claim 1 or 2.

* * * * *